United States Patent [19]

Bernard et al.

[11] 4,298,797

[45] Nov. 3, 1981

[54] SPECTROGRAPH USABLE IN PARTICULAR IN THE FAR ULTRAVIOLET

[75] Inventors: Claude R. Bernard, Longjumeau; Bernard Daigne, Chatillon; François Girard, Paris, all of France

[73] Assignee: Office National d'Etudes et de Recherches Aerospaticles, France

[21] Appl. No.: 10,820

[22] Filed: Feb. 9, 1979

[30] Foreign Application Priority Data

Feb. 15, 1978 [FR] France ............................ 78 04317

[51] Int. Cl.³ .......................... G01J 1/42; G01J 3/28
[52] U.S. Cl. .................................. 250/372; 356/328
[58] Field of Search ............... 356/306, 328, 326, 307, 356/313, 329, 305; 250/372

[56] References Cited

U.S. PATENT DOCUMENTS

| | | | |
|---|---|---|---|
| 2,279,646 | 4/1942 | Smith | 356/328 |
| 2,436,104 | 2/1948 | Fisher et al. | 356/306 |
| 3,116,415 | 12/1963 | Jones | 356/305 |
| 3,495,909 | 2/1970 | Axelrod | 356/305 |
| 3,498,720 | 3/1970 | Kuhlhaas et al. | 356/328 |
| 3,518,426 | 6/1970 | Campbell | 356/328 |
| 4,099,873 | 7/1978 | Grisar et al. | 356/313 |

FOREIGN PATENT DOCUMENTS 2841732  4/1979  Fed. Rep. of Germany ...... 356/505

OTHER PUBLICATIONS

Kumar et al., "Extreme Ultraviolet Spectrometer for Space Research", Applied Optics, vol. 13, No. 3, Mar. 1974, pp. 575-580.

Primary Examiner—Alfred E. Smith
Assistant Examiner—Carolyn E. Fields
Attorney, Agent, or Firm—Kane, Dalsimer, Kane, Sullivan and Kurucz

[57] ABSTRACT

A spectrograph usable more particularly in the far ultraviolet range. It comprises along the Rowland circle measuring blocks including photo-detectors. Said measuring blocks are movably mounted along a guiding rail materializing the Rowland circle. Motion means are provided for the displacement of the various measuring blocks along the guiding rail. Transmission means between the motion means and a measuring block constantly direct the latter towards the diffraction grating.

5 Claims, 5 Drawing Figures

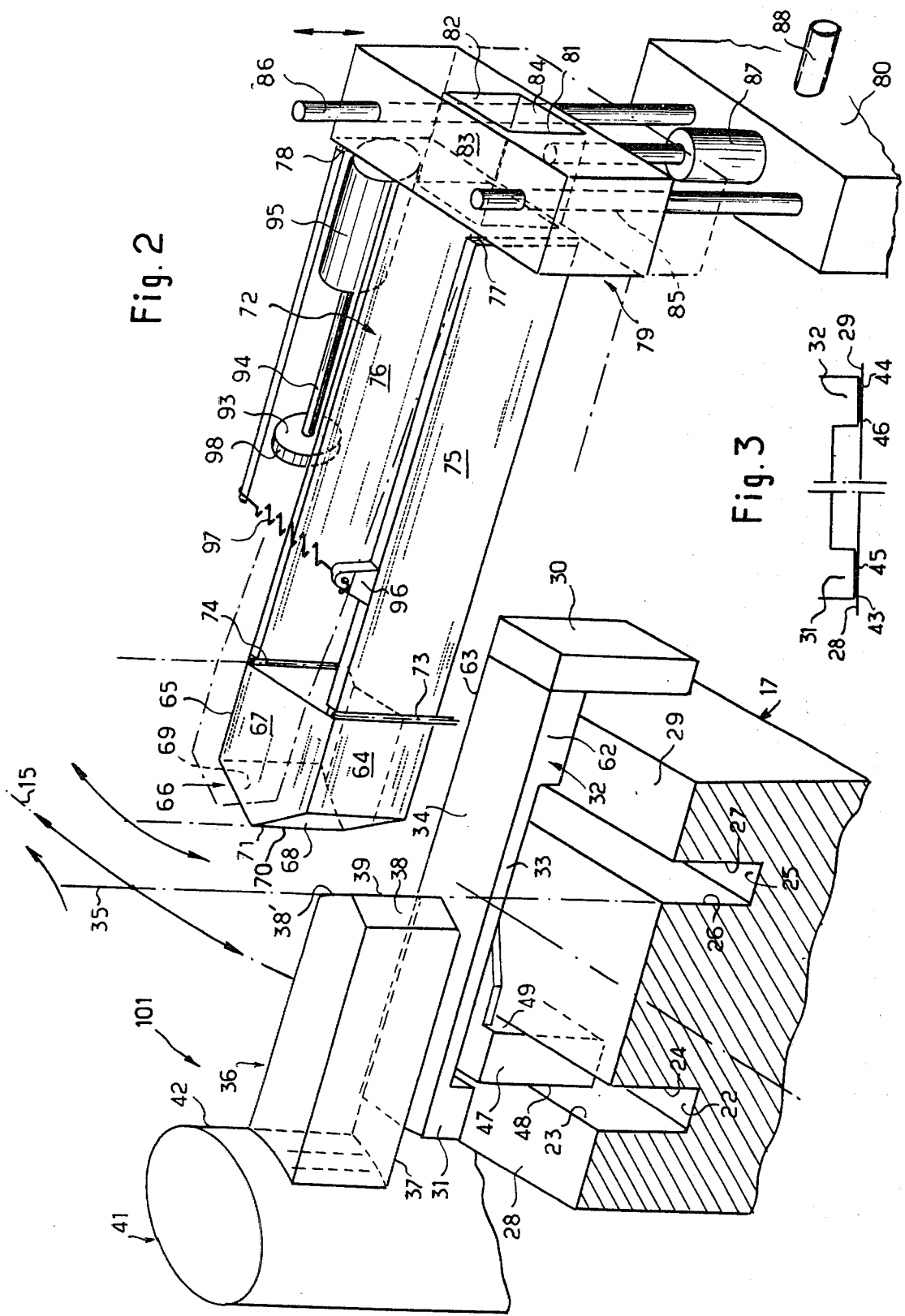

SPECTROGRAPH USABLE IN PARTICULAR IN THE FAR ULTRAVIOLET

BACKGROUND OF THE INVENTION

The object of the present invention is a spectrograph which can be used in particular in the far ultraviolet.

Spectrography in the far ultraviolet is used for the analysis of samples, and particularly of samples made of refractory materials, through formation from the latter of a plasma in a chamber free of air, the plasma being observed by the spectrograph through a slot provided in a wall of the chamber.

In the far ultraviolet field, the spectral lines supplied by the diffraction grating which is part of the spectrograph are extremely numerous and it is a reason why, in industry, only pre-set spectrographs are known for quantitatively analyzing in an analysed sample the chemical elements fixed beforehand.

In practice, to each current metallic alloy corresponds a determined spectrograph with which the user may analyze quantitatively the elements fixed beforehand of the alloy, whether metals or metalloids.

Said spectrographs comprise photo-detectors, each of which corresponding to the quantitative analysis of an element, disposed on the points of a circle, so-called Rowland circle, where the characteristic radiations focus, corresponding to the used diffraction grating.

Although for laboratory work monochromators are known which comprise a photo-detector movably mounted on the Rowland circle so as to be able to determine for each point of the circle the intensity of the diffracted radiation, and therefore trace out profiles, it has not been possible till now to provide the industry with a spectrograph comprising mobile photo-detectors and thereby adaptable to the analysis of different metallic alloys.

SUMMARY OF THE INVENTION

The invention provides such a spectrograph.

Its object is a spectrograph which can be used particularly in the far ultraviolet, comprising a diffraction grating, and is characterized in that it comprises, distributed according to the Rowland circle attached to the grating, a plurality of mobile photo-detectors, means being provided so that in any position of a photo-detector, said detector is automatically directed towards the grating so as to receive the image of the input slit supplied by the latter.

In an embodiment to each photo-detector is associated a slit device, means being provided so that said slit device takes at will one or the other of either condition, the first where the slit is wide and allows quantitative analysis of an element, and the other where the slit is very narrow and makes the tracing of the profile possible, that is the determination of the intensity received from the photo-detector at each point of the Rowland circle.

According to one type of construction, each photo-detector is formed with a wide slit and it is a device common to all the photo-detectors which is associated with each of them for limiting the operational width of said slit so that said photo-detector may trace a profile.

According to the invention also, it is said device common to all the photo-detectors which is operative for providing displacement of the photo-detector to which it is associated. The construction of the spectrograph is thereby particularly simple.

BRIEF DESCRIPTION OF THE DRAWINGS

The following description, which is given by way of examplification, refers to the accompanying drawings wherein:

FIG. 2 is a perspective schematic view at a larger scale;

FIG. 3 is a very schematic vertical cross-sectional view at a smaller scale showing the support on the guiding rail;

DETAILED DESCRIPTION OF THE INVENTION

Figure 1:
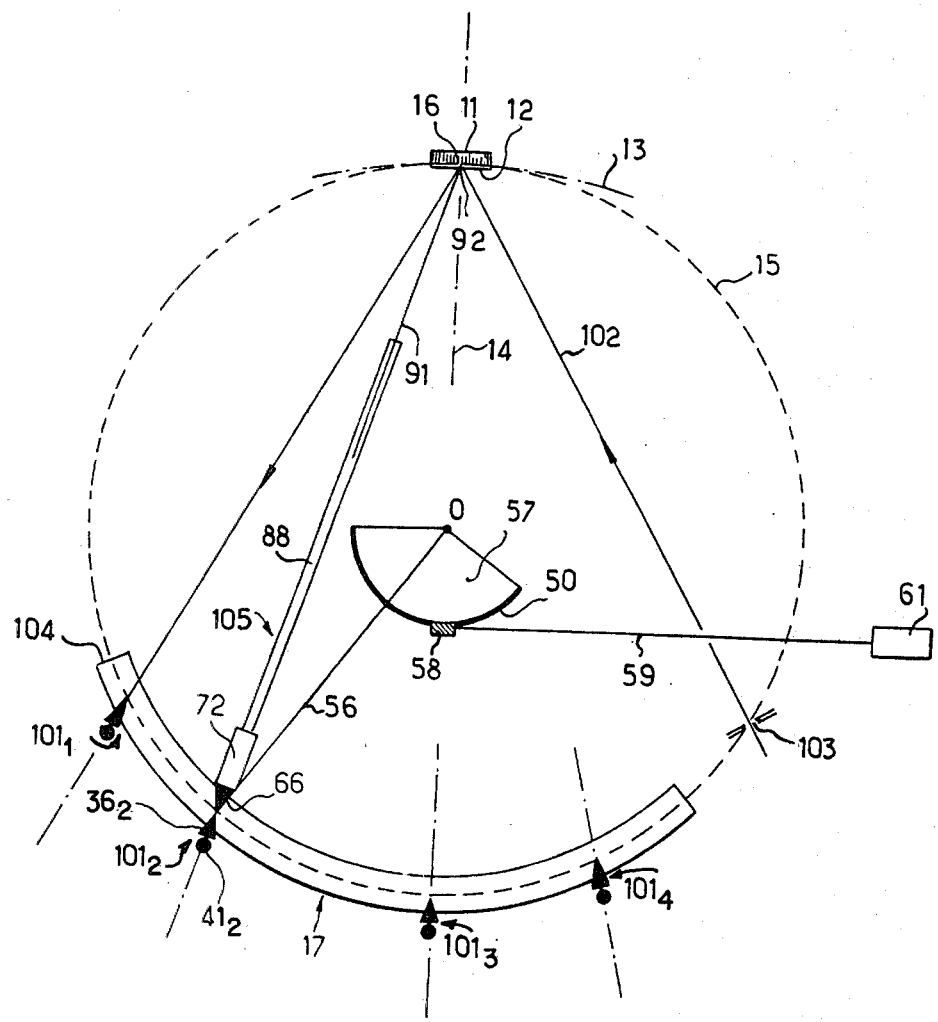
FIG. 1 is a schematic plan view.

The spectrograph comprises a diffraction grating 11 (FIG. 1) advantageously obtained through holography, the lines of the grating being on the surface 12 of a spherical cap 13 with an apex 16, an axis 14 and a radius 2R.

Along part of the Rowland circle 15 of radius R associated with said grating and with a center O on axis 14 is arranged a guiding rail 17.

The latter is a massive cast iron piece, rectangular in cross-section, formed with two circular grooves 22 and 25 (FIG. 2) the side faces 23, 24 of and 26, 27 of which are cylindrical surfaces centered on point O. Grooves 22 and 25 open on the upper face of the guiding rail 17.

The horizontal faces 28 and 29 of rail 17 serve as a bearing surface respectively for two pads 31 and 32 of a support 33 of general parallelepipedic shape, on the upper face 34 of which is rotatably mounted about a vertical axis 35 a casing 36, also of general parallelepipedic shape, the bottom 37 of which engages the upper face 34 of the support, and ending at its inner end, that is turned towards axis O, by two oblique faces 38 and 38' limiting a slit 39, relatively wide and adapted for the quantitative analysis with the help of a photomultiplicator 41 the envelope 42 of which is rigid with casing 36, of an element whose characteristic line is coincident with slit 39, the disposition of casing 36 being such that slit 39 is situated on the Rowland circle 15.

The lower face of each pad 31 and 32, respectively 43 and 44 (FIG. 3), is covered with a glass fabric film coated with PTFE, respectively 45 and 46 (FIG. 3).

From support 33 depends downwardly at its outer end a block or slide 47 of parallelepipedic cross-section and of cylindrical configuration, so that its side faces 48 and 49 are engaged with faces 23 and 24 of slot 22, with the interposition of a sliding element not shown.

Block 47 is advantageously removably mounted on support 33 so as to be able, in an other condition, to be connected to block 33 so that its faces 48 and 49 are engaged with faces 26 and 27 of the other slot 25 formed on the guiding rail 17.

A counterweight 30 fixed at the other end of block 33 balances the mass of photo-multiplicator 41.

Figure 4:
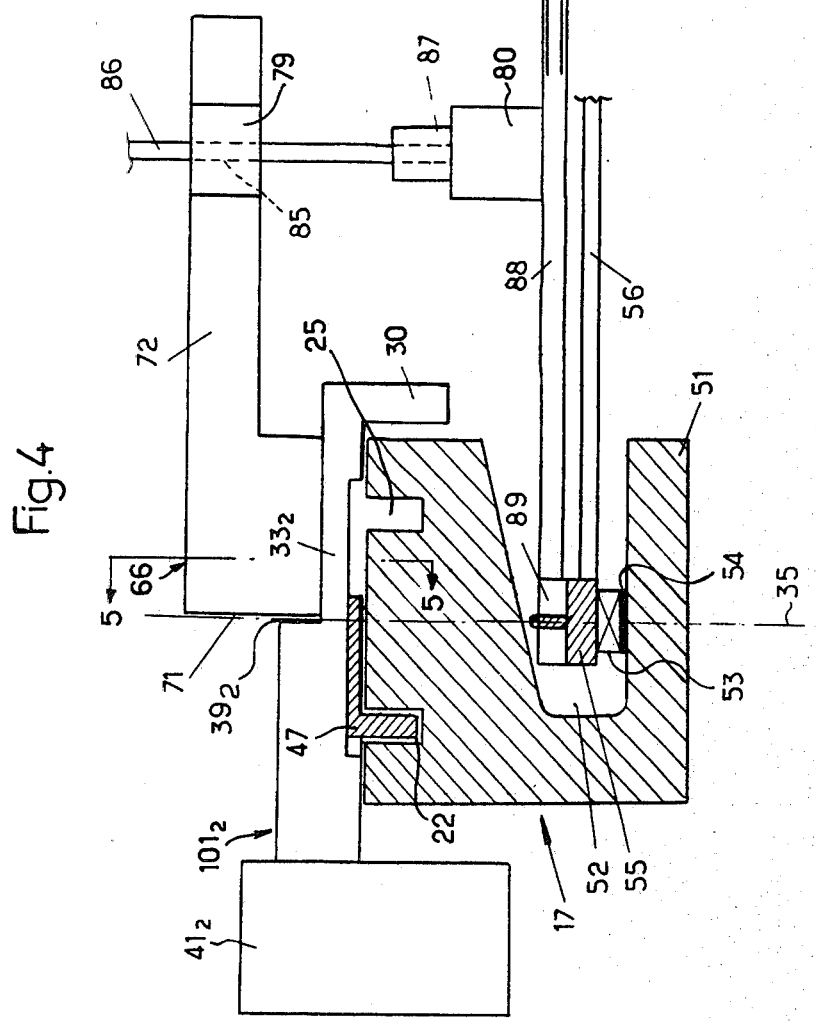
FIG. 4 is a vertical cross-sectional schematic view.

On a base 51 (FIG. 4) of rail 17 formed by a groove 52 in the inner periphery of the latter slides a portion of a circular ruler 53 coated with PTFE on its lower face 54 and integral with an eyelet 55 forming the end of an arm 56 (FIGS. 1 and 4) attached to a sector 57 rotatably mounted about axis O. With arm 56 is integral a toothing of a circular rack traced on a cylindrical surface 50 of axis O, toothing 50 being engaged with an endless screw 58 forming the end of the shaft 59 of a first electric motor 61 of the step by step type.

Figure 5:
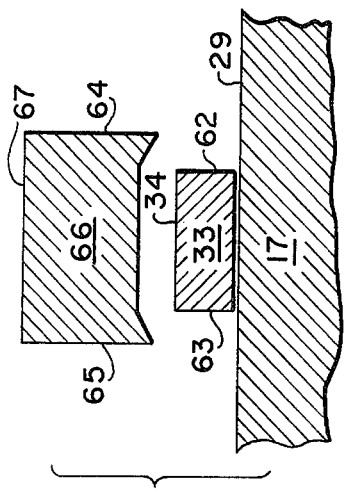
FIG. 5 is a fragmentary sectional view taken along the line 5—5 of FIG. 4.

With the inner end of support 33, and more precisely with the radial faces 62 and 63 of pad 32, are adapted for cooperation the side flanges 64 and 65 of a cap 66 open in its lower portion and limited on the other hand by an upper face 67 and two oblique frontal faces 68 and 69 ending each in an edge 70 situated in a plane equidistant to faces 64 and 65, a narrow slit 71 being provided by the oblique faces 68 and 69 along said edge. These features are illustrated in FIGS. 2 and 5.

The cap 66 is mounted at the end of a bracket 72 comprising two rigid side walls 75 and 76 connected through thinned out portions or resilient blades 73 and 74 to the side flanges 64 and 65 of cap 66 and connected likewise through thinned out portions or resilient blades 77 and 78 to a connecting piece 79 formed with a tubular passage of same inner cross-section as bracket 72. The connecting piece 79 is mounted via vertical passages 85 extending through it on rods 86 and they assume one or the other of two positions by vertically sliding, for instance under the action of an electro-magnet 87. The electro-magnet 87 is carried on a support 80 fixed on a second arm 88 (FIG. 1) carrying on its outward end an eyelet 89 (FIG. 4) through which it is rotatably mounted about axis 35, as arm 56. The arm 88 is engaged telescopically around a tube 91 the opposed end 92 of which is rotatably mounted about the vertical axis extending through the apex 16 of the grating 11.

A cam 93 mounted on the shaft 94 of a second electric motor 95, also of the step by step, can cooperate with the wall 76 of bracket 72. On the wing 96 rigid with the opposite wall 75 is attached a spring 97 constantly biasing wall 76 against the operational periphery 98 of cam 93.

The operation is the following:

A sample to be analyzed is placed in an under vacuum enclosure comprising a spark source generating a plasma from the sample. The radiation emitted by the plasma provides a beam 102 which is received by grating 11 through the input slit 103 of the spectrograph.

In the condition shown in FIG. 1, the spectrograph comprises, distributed along the Rowland circle 15, several measuring blocks $101_1$, $101_3$, $101_4$ comprising each a casing 36 on a photo-multiplicator 41. Each of said measuring blocks is adapted for supplying a quantitative information about a constituent element of the sample, a characteristic line of which corresponds to the position of the measuring block along the guiding rail 17.

In the condition shown in FIG. 1, the measuring block $101_2$ is in a cooperating position with a displacement device 105 made of the bracket 72, the arm 56 and the arms 88, 91. In the condition shown in FIG. 4, the bracket 72 is in its high position. However its slit 71 is opposite slit $39_2$ of the measuring block $101_2$. The photo-multiplicator $41_2$ receives then only the portion of the radiation corresponding to the one which crossed the narrow slit 71. The presence of the wide slit $39_2$ allows taking in account the thermal dilatation and the vibrations.

By exciting the electro-magnet 87, the cap 66 carried by bracket 72 is brought to its lower position; the flanges 64 and 65 surround faces 62 and 63 of support $33_2$. The drive of bracket 72 by either one of motors 61 or 95 shifts the measuring block $101_2$ along the Rowland circle. The movement is made without noticeable resistence due to the interposition of the glass fabric films coated with PTFE 45 and 46 with which the pads 31 and 32 are provided, and also the PTFE coatings loaded with bronze of faces 48 and 49 of guiding block 47. The films 45 and 46 having many points of contact avoid the suction effect which would appear with surfaces perfectly planar when vacuum in the spectrograph is applied.

If a relatively quick displacement of the measuring block $101_2$ is desired, it is the motor 61 which is used. It is the case for instance when one wishes to bring measuring block $101_2$ in a predetermined position on the Rowland circle.

If on the contrary one wishes a slow displacement and a very accurate position for block $101_2$, one calls upon motor 95 the transmission of which is carried out rigourously without any play. It is the case for instance when one wishes to establish a "profile", that is to measure the radiating intensity according to a line, or to check the centering. The displacements may be measured by a differential transformer which is not shown.

The displacements are made possible by the rotatory mounting of casing 36 on support 33 about axis 35 and also by the articulations of walls 75 and 76 at their ends and relative on the one hand to cap 66 and on the other hand to piece 79, also by the telescopic mounting of arm 88 on tube 91.

When two measuring blocks 101 are to be placed very close to each other on the Rowland circle, one of them is mounted by using groove 22 of the guiding rail 17 and the other by using groove 25.

When moving the blocks, one foresees to use as origin for the path of travel a fixed position on the guiding rail 17, for instance the position of the reflected ray, such as is shown in FIG. 1, which is incident on measuring block 101, thereby allowing—knowing the relation between the number of control steps of motor 61 and the wavelength—by counting the control pulses, to know the wavelength corresponding to each position.

Optical micro-sensors are provided for being informed of the positions of each of the blocks.

Safety devices are also foreseen for avoiding that during an operation two measuring blocks come too close to each other.

The spectrograph according to the invention is well adapted for the quantitative analysis of the elements of all alloys.

Owing to its spectral range extended towards the very short wavelength, it can analyze quantitatively metals as well as metalloids and gases, whether their constitutents are in high or low concentration.

Good results have been obtained with a spectrograph the Rowland circle of which had a diameter of 1.5 mm, an input slit having a width of 20 microns and a height of 8 mm, the incidence angle of the radiation on the grating being of 30°. The concave active face of the grating had a radius of 1.5 m and was provided with 2400 lines to a millimeter.

The usefull portion of the spectrum is comprised between 140 and 3500 Å, with an average dispersion of 2.5 Å/mm.

Each measuring block had an input slit with a width equal to 100 microns situated at 0.5 mm behind the Rowland circle.

It was possible to position twenty measuring blocks.

The movement caused by the motor acting through the cam covered a path of +1 mm with a resolution of 0.02 mm per step.

It was possible to profile in a reversible way an area of the spectrum of 5 Å with a solution of 0.05 Å per step.

The position of the input slit and the characteristics of the diffraction grating of the spectrograph made it possible by applying the described means to work in an area of very varied wavelength such as, according to the source used, the ultraviolet, the infrared and the X-rays.

What is claimed is:

1. A spectrography apparatus of the Rowland type usable in the far UV range, comprising:
    a diffraction grating located on a point of the Rowland circle;
    a rail along a portion of the Rowland circle;
    at least one UV detector means, a support slidably mounting the detector means on said rail;
    an orienting means capable of linking said grating and said detector means for directing the latter towards the diffraction grating, said orienting means including a telescopic arm having an end close to said detector means, said end including a coupling means capable of coupling with said support;
    said coupling means being constituted by a cap which can be displaced downwardly in order to nest on said support and orient it towards the diffraction grating.

2. A spectrography apparatus of the Rowland type usable in the far UV range, comprising:
    a diffraction grating located on a point of the Rowland circle;
    a rail along a portion of the Rowland circle;
    at least one UV detector means, a support slidably mounting the detector means on said rail;
    an orienting means capable of linking said grating and said detector means for directing the latter towards the diffraction grating;
    motion means for displacing said detector means along said rail, said motion means being coupled with said orienting means and including a first motor having a relatively quick motion and a second motor having a relatively slow motion;
    the orienting means including a driving bracket, the slow motor acting on said driving bracket through a cam in engagement with said bracket, said bracket having a rigid wall and being part of a deformable parallelogram system coupled at one of its ends to the detector means and at the other end on a support depending from a telescopic arm of the orienting means.

3. A spectrography apparatus of the Rowland type usable in the far UV range, comprising:
    a diffraction grating located on a part of the Rowland circle;
    a rail along a portion of the Rowland circle;
    at least one UV detector means, a support slidably mounting the detector means on said rail;
    an orienting means capable of linking said grating and said detector means for directing the latter towards the diffraction grating, said orienting means including an orienting arm linked to a motion transmitting arm operated by a motor to move said orienting arm angularly and displace said detector means on said rail, said motion transmitting arm being rotatively mounted at the center of the Rowland circle, and said motion transmitting arm also having an end mounted near said detector means.

4. A spectrography apparatus of the Rowland type usable in the far UV range, comprising:
    a diffraction grating located on a part of the Rowland circle;
    a rail along a portion of the Rowland circle;
    at least one UV detector means, a support slidably mounting the detector means on said rail;
    an orienting means capable of linking said grating and said detector means for directing the latter towards the diffraction grating; and
    a UV radiation transmitting means carried by said orienting means, said transmitting means being provided with a narrow slit, said detector means also including a slit, said slit of said transmitting means being thinner than said slit of said detector means, said transmitting means being displaceable in front of the slit of the detector means.

5. A spectrography apparatus according to claim 4, wherein said transmitting means are supported by a deformable parallelogram system which can be deformed by a cam driven by a motor in order for the narrow slit to be displaced in front of the detector slit.

* * * * *

UNITED STATES PATENT AND TRADEMARK OFFICE
CERTIFICATE OF CORRECTION

PATENT NO. : 4,298,797
DATED : November 3, 1981
INVENTOR(S) : Claude R. Bernard, et al It is certified that error appears in the above—identified patent and that said Letters Patent is hereby corrected as shown below:

On the first page of the patent, line 2 of the assignee should be changed from "Aerospaticles" to --Aerospatiales--.

Signed and Sealed this

Sixth Day of April 1982

[SEAL]

Attest:

GERALD J. MOSSINGHOFF

Attesting Officer     Commissioner of Patents and Trademarks